Oct. 4, 1966     W. E. SHOUPP     3,276,914
REACTOR-THERMOELECTRIC GENERATOR
Filed Aug. 15, 1962     2 Sheets-Sheet 1
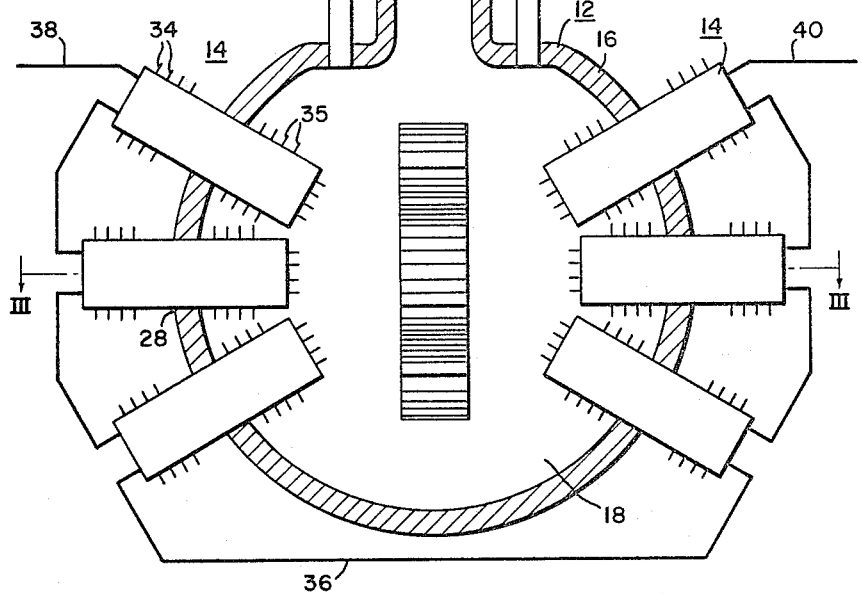
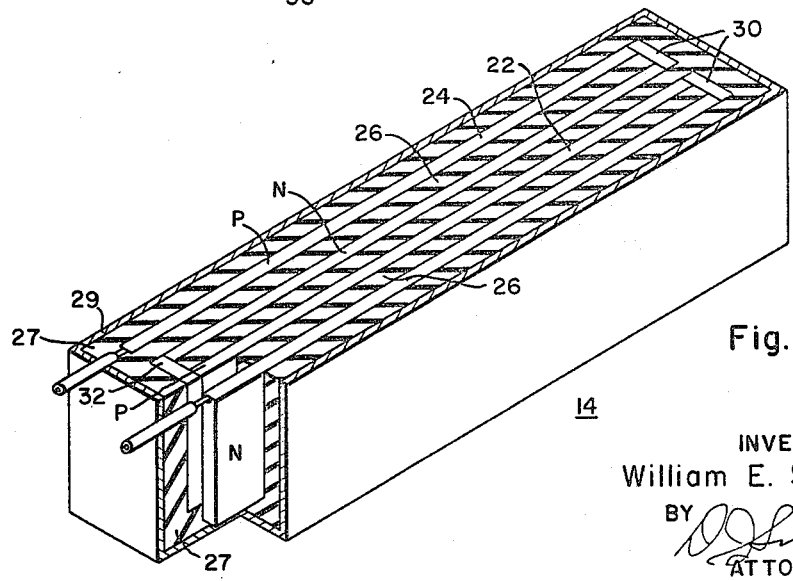
INVENTOR
William E. Shoupp
BY
ATTORNEY Oct. 4, 1966 W. E. SHOUPP 3,276,914
REACTOR-THERMOELECTRIC GENERATOR
Filed Aug. 15, 1962 2 Sheets-Sheet 2

3,276,914
REACTOR-THERMOELECTRIC GENERATOR

William E. Shoupp, Pittsburgh, Pa., assignor to Westinghouse Electric Corporation, East Pittsburgh, Pa., a corporation of Pennsylvania
Filed Aug. 15, 1962, Ser. No. 216,998
2 Claims. (Cl. 136—202)

The present invention relates to electric power generators and more particularly to thermoelectric generators having a nuclear reactor as a heat source.

It is well known that thermoelectric generators operating on the basis of the Seebeck voltage generating effect serve as reasonably efficient converters of energy, namely from heat directly to electricity. In many applications, the advantage of direct conversion more than offsets any otherwise unremedied disadvantage in thermoelectric efficiency as compared to the conversion efficiency of more traditional multi-stage energy converters. For example, in remote or inaccessible locations the use of converters or thermoelectric generators without moving parts and with little requirement for maintenance in service is preferred and even sometimes necessitated as compared to the use of more traditional converters such as steam-generator arrangements.

If the energy source for the thermoelectric generator is characterized as a self-sustaining heat generator, then the entire conversion system theoretically approaches in character a service-free life. It is in this connection that nuclear reactors serve advantageously as a heat source for the thermoelectric generator since such reactors provide continuous heat energy over the life of the self-sustaining nuclear chain reaction. It is evident, however, in previous nuclear reactors, especially in heterogeneous ones, that the performance of nuclear control and fluid circulating functions is required, and, to the extent that nuclear control or pumping or other apparatus is employed for these or other incidental functions, a service-free life is not in fact obtained for such reactors.

In accordance with the broad principles of the present invention, a substantially service-free reactor-thermoelectric generator comprises a homogeneous reactor with which thermoelectric elements are so correlated as to generate electric power in response to thermal energy transferred thereto from the homogeneous or quasi-homogeneous fissile material of the reactor. Assuming that sufficient fuel is suitably located within a pressure vessel of the reactor to sustain a chain reaction, automatic control of the reaction can be incorporated in the reactor by means of a chamber into which the fissile material can expand and thereby create a negative temperature coefficient of reactivity to maintain the chain reaction against unstable growth.

It is therefore an object of the invention to provide a novel and efficient reactor-thermoelectric generator.

It is another object of the invention to provide a novel and efficient reactor-thermoelectric generator wherein the reactor fuel is provided as a part of a homogeneous medium in which alternate thermoelectric junctions are immersed to receive heat therefrom.

It is a further object of the invention to provide a novel and efficient reactor-thermoelectric generator as set forth in the preceding object, wherein a gas-filled chamber is provided adjacent the reactive region of the reactor so that the homogeneous medium can expand therein and thereby control the nuclear chain reaction.

These and other objects of the invention will be more fully understood upon consideration of the following detailed description along with the attached drawings, in which:

FIG. 1 shows a vertical section of a thermoelectric generator constructed in accordance with the principles of the invention.

FIG. 2 is a perspective view of a thermoelectric unit used as a part of the thermoelectric generator of FIG. 1.

Figure 3:
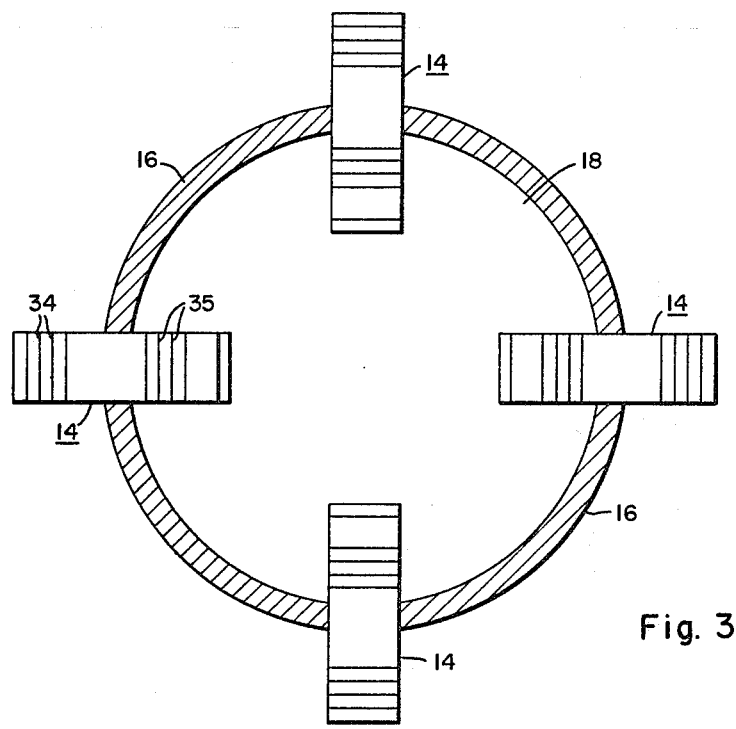
FIG. 3 shows a cross-section of the generator shown in FIG. 1.

A reactor-thermoelectric generator 10 is shown in FIG. 1 as comprising a homogeneous or quasi-homogeneous nuclear reactor 12 and one or more or preferably a plurality of elongated thermoelectric units 14 coupled with the nuclear reactor 12 in accordance with the principles of the invention. The reactor 12 comprises a pressure vessel 16 which in this instance generally spherically bounds a nuclearly reactive region 18 in which a homogeneous fuel medium is provided in fluid form. The pressure vessel 16 of course can have other general shapes and in any event it is designed to withstand the expected operational pressures and temperatures and for this purpose can be formed from a corrosion-resistant structural or carbon steel lined with stainless steel material such as stainless steel.

The homogeneous fuel medium in this instance is provided in the form of uranyl sulfate or $U(SO_4)_3$ dissolved in water (either ordinary or heavy). The fuel concentration for operability can be in the range of 40 to 75 grams per liter of fuel solution. Preferably, the fuel itself is highly enriched with $U^{235}$ (or $U^{233}$, $Pu^{238}$, $Pu^{241}$) so as to enable the pressure vessels 16 to be reduced relatively in size. However, size reductions in the pressure vessel 16 leads to less wall surface through which the thermoelectric units 14 can be extended and through which waste heat can be transferred and therefore fuel enrichment and pressure vessel size are essentially determined by balancing the need for thermoelectric units 14 and heat transfer area against the desirability of size reduction in the pressure vessel 16. Although it is expected that operating economies would be relatively unimportant for most applications of the inventions, and although leakage neutron flux is relatively high, conversion or breeding operations can be performed during reactor life by inclusion of fertile material such as $U^{238}$ or $Th^{232}$ in the fluid volume.

Although other suitable homogeneous or quasi-homogeneous fuel mediums, such as slurries or suspensions of particulate fuel material in a suitable carrier fluid can be employed in practicing the invention, it is noted that uranyl sulfate dissolved in water is preferred on the basis of tests conducted by the AEC at Oak Ridge, Tennessee which have evidenced this to be a practicable fuel for a homogeneous nuclear reactor.

When use is to be made of the reactor 12, the fluid fuel can be injected into the reactor vessel 16 through one or more pipes 19 which can thereafter be closed through welding.

In this connection, it is noted that start-up can be safely accomplished by immersing the vessel 16 in ten or more feet of water (beside a ship at sea, for example) so that the pipes 19 project above the water surface. Fluid injection and pipe welding can then follow and the reactor 12 can then be lowered to the bottom of the water body.

The nuclear chain reaction can be initiated after fluid injection by suitable means, for example by a neutron source (not shown) which can be suitably located within the reactor vessel 16. If desired, additional solid uranyl sulfate (not shown) can be suitably supported relative to the reactor vessel 16 to provide for metered or timed release of solid fuel into solution so as to extend reactor life or so as to prevent premature sub-criticality and otherwise to account for fuel depletion over power generating life. In other respects the reactor 12 generally operates on the basis of chain reaction theory which is now well known or readily ascertainable in published material.

Once the chain nuclear reaction is initiated, control is in this instance provided by a chamber 20 which is preferably filled with a chemically and nuclearly nonreactive gas, such as argon. Thus, as the temperature of the fluid fuel increases because of fission heat, such fluid tends to expand into the chamber 20. More specifically, when the fuel is so heated, the moderating water molecules (or hydrogen atoms of the water) as well as the fissile (uranium) atoms in the reactive region 18 of the reactor vessel 16 become less dense since some of the fluid fuel including water is removed therefrom and expands or vaporizes into the chtmber 20. Accordingly, the rate at which fission-producing neutron production occurs is reduced, and the chain reaction is subjected to a greatly accentuated, negative temperature coefficient of reactivity. With suitable choice of geometrical, nucleonic and other parameters, the chain reaction rate can be automatically controlled to produce heat at a substantially uniform rate for conversion to electric energy by the thermoelectric unit or units 14. If desired, solid strips of material containing boron can be suitably supported within the reactor vessel 16 to aid in reactivity control and to provide for longer reactor life by allowing for greater beginning reactivity through the resulting time "burning" of the boron "poison." In accessible plant locations electromechanical control rods can also be used for reactivity control, but where access is problematical such rods are not advisable.

Some generated heat is transferred as waste energy to the exterior through the wall or walls of the reactor vessel 16. Most of the balance of the heat is transferred to the thermoelectric units 14 which are supported relative to the reactor vessel 16 in a manner now to be described.

Each thermoelectric unit 14 can be in any suitable form so long as alternate thermoelectric junctions 30 (FIG. 1) of a series of elements in each unit 14 are disposed for heat transfer from the fluid fuel of the reactor 12. The remainder of the thermoelectric junctions 32 (FIG. 1) of course are located outside the reactor vessel 16 and are there kept relatively cool to establish the temperature differential necessary for producing electrical energy in accordance with the Seebeck effect. As noted previously in connection with nuclear chain reaction theory, the theory of thermoelectric energy is well known or readily available in published material and therefore will not be considered here.

As one example of the manner in which the externally located portions of the thermoelectric unit or units 14 can be cooled, the entire generator 10 can be located in sea water, for example to energize sonar apparatus, and in this application the sea water would serve as a heat sink both to keep the external thermoelectric junctions 32 cool and to accept waste heat from the reactor vessels 16. In other applications, forced cooling can be provided.

In this specific case, each of the thermoelectric units 14 comprises a plurality of semi-conductive p elements 22 and semi-conductive n elements 24 which are arranged alternately in electrical series. As shown by way of illustration in FIG. 2, the thermoelectric elements 22 and 24 are provided in the form of elongated rectangular slabs consistently with the illustrative solid rectangular geometry of the thermoelectric unit 14. The thermoelectric elements 22 and 24 are divided by respective layers 26 (FIG. 2) of insulation formed from an insulative material which is preferably a good conductor of heat and poor conductor of electricity. An example of such an insulative material is boron nitride. If desired, any other geometry can be provided for the thermoelectric unit 14 so long as a temperature differential between thermoelectric junctions 30 and 32 is established in the longitudinal directions of the unit or units 14.

The thermoelectric elements 22 and 24 can further be covered by a layer 29 of protective cladding material such as stainless steel. As viewed in FIG. 1, adjacent ends of alternate pairs of the thermoelectric elements 22 and 24 are conductively bridged by any suitable means such as conductive strips, to form the thermoelectric hot junctions 30 (p-n) within the reactor vessel 16 and thermoelectric cold junctions 32 (p-n) without the reactor vessel 16. Fins 34 can be extended outwardly from the cladding layer 29 adjacent the outer end of the thermoelectric unit 14 so as to provide additional cooling surface at the thermoelectric junctions 32. Similarly, fins 35 can be extended outwardly of the cladding layer 29 adjacent the inner end of the thermoelectric unit 14 so as to promote heating of the thermoelectric junctions 30.

Each thermoelectric unit 14 is extended through an opening in the reactor vessel 16 and supported thereon by suitable means so as to be sealed therewith, for example by seal-welding as indicated by the reference character 28. The number of thermoelectric units 14 employed depends upon design specification and in this instance twelve are shown for illustrative purposes only. It is to be understood, however, that a greater or lesser number of units 14 can be employed as dictated by the thermal output of the reactor and the size, efficiency, etc. of the unit 14. The thermoelectric units 14 shown are connected in series by cables 36 (only one shown to provide clarity) and output cables 38 and 40 are employed for making a load connection. The cables 36, 38 and 40 are extended and suitably sealed insulatively through the portion of the cladding 29 which covers the outer end of each thermoelectric unit 14 for conductive connections to the appropriate thermoelectric element 22 or 24. The reactor 12 is essentially self-stabilizing and therefore as load demand through the units 14 increases, fluid temperature drops to allow greater power generator. When load power drops, fluid temperature rises and power generator is cut back. In any event, the amount of electric power output would be small compared to the amount of waste heat and the load factor just considered is of relatively minor importance on most applications.

Material selections for the thermoelectric elements 22 and 24 preferably should be made on the basis of maxium thermoelectric efficiency compatible with substantial immunity against radiation effects. Thus, the selection of thermoelectric materials can be made from the semiconducting type, the mixed valence type, or the intermetallic type. An example of a suitable semiconductive material is Lead Telluride, which can be suitably doped to form p and n components.

It follows from the foregoing that the invention provides an efficient yet relatively simple reactor-thermoelectric generator which has considerable utility. The power rating for such a generator can be on the order of several kilowatts and is therefore especially suitable for special purpose remote power generating duties.

The description presented here has been only for the purpose of illustration. Accordingly, it is desired that the invention not be limited by the embodiment or embodiments described, but, rather, that it be interpreted in accordance with the scope and spirit of its broad principles.

What is claimed is:

1. A reactor-thermoelectric generator comprising a self sustaining nuclear reactor having a pressure vessel and a fissionable fluid fuel disposed in a reactive region thereof, at least one elongated thermoelectric unit hermetically secured to and suitably supported relative to said pressure vessel and having an outer end thereof located outwardly of said pressure vessel and the inner end thereof located inwardly of said pressure vessel and immersed in said fluid fuel, said thermoelectric unit having a plurality of elongated thermoelectric elements forming a plurality of P-N junctions therebetween, an outer cladding surrounding said thermoelectric unit, means hermetically securing said vessel to said cladding, insulation means interposed between said thermoelectric elements and said cladding, a plurality of fins extending outwardly of said cladding adjacent said outer and said inner ends respectively of said thermoelectric unit so as to promote heat transfer respectively from and to said unit, and means for interconnecting said thermoelectric elements to form said P–N junctions adjacent their ends so as to form a series electric path through said elements and so as to provide alternate thermoelectric hot junctions in the heated region of said inner end of said thermoelectric unit and thermoelectric cold junctions in the cooled region of said outer end of said thermoelectric unit.

2. A self-sustaining and self-stabilizing reactor-thermoelectric generator for directly producing electrical power without the need for maintenance and external adjustments and suitable for insertion into a body of liquid comprising, a nuclear reactor having a pressure vessel, a fissionable fluid fuel comprising a solution of a uranium compound dissolved in water disposed in a reactive region of said pressure vessel, a plurality of spaced thermoelectric units each hermetically secured to and protruding through said pressure vessel with an outer portion of each unit located outwardly of said pressure vessel and an inner portion of each unit located inwardly of said pressure vessel and immersed in said fluid fuel, said thermoelectric units each having a plurality of thermoelectric elements between said inner and outer unit portions with adjacent ones of said thermoelectric elements forming p–n junctions therebetween, a plurality of outer cladding members surrounding said thermoelectric units, respectively, insulation means interposed between said thermoelectric elements of each of said units and said cladding members, respectively, means hermetically securing each of said cladding members to said vessel, and means for interconnecting said thermoelectric elements to position and p–n junctions of each of said thermoelectric units in a series electric path through said elements and so as to provide alternate thermoelectric hot junctions in the heated region of each of said thermoelectric units and thermoelectric cold junctions in the cooled region of each of said thermoelectric units, whereby the aforesaid liquid body absorbs the excess heat produced by said reactor.

References Cited by the Examiner
UNITED STATES PATENTS

| | | | |
|---|---|---|---|
| 781,288 | 1/1905 | Marsh | 136—4 |
| 2,908,621 | 10/1959 | Segre et al. | 176—11 |
| 3,015,617 | 1/1962 | Brunings | 176—37 |
| 3,028,327 | 4/1962 | Weeks | 176—37 |
| 3,056,848 | 10/1962 | Meyers | 136—4 |
| 3,118,818 | 1/1964 | Bray | 136—4 |

OTHER REFERENCES

May 1959, Nucleonics, pp. 166–168, 171, 172 and 174.

Direct Conversion of Heat to Electricity by J. Kaye and J. A. Welsh, John Wiley and Sons, N.Y. 1960, pp. 16-6 to 16–17.

Propulsion Systems for Space Flight by W. R. Corliss, McGraw-Hill Book Co., N.Y. 1960, pp. 116–118.

Nuclear Science and Engineering, vol. 6, No. 5. November 1959, pp. 428–432.

REUBEN EPSTEIN, *Primary Examiner.*

CARL D. QUARFORTH, *Examiner.*